Figures 7, 8, 9, 14:
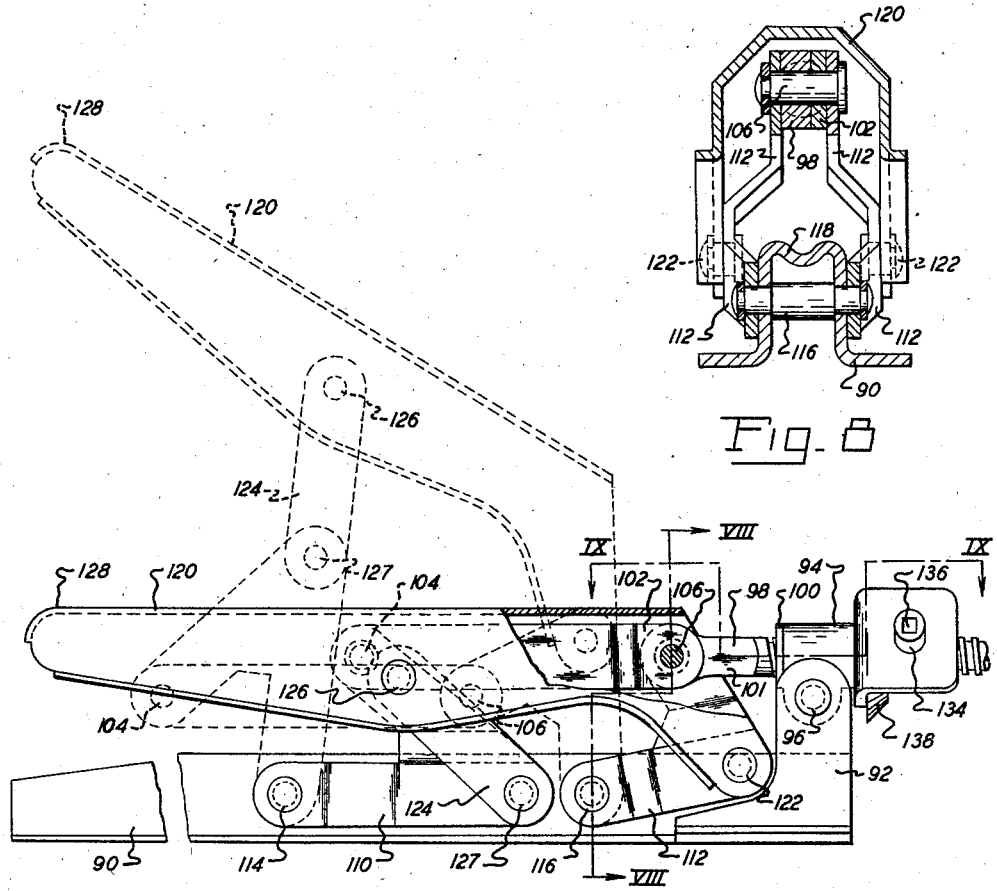

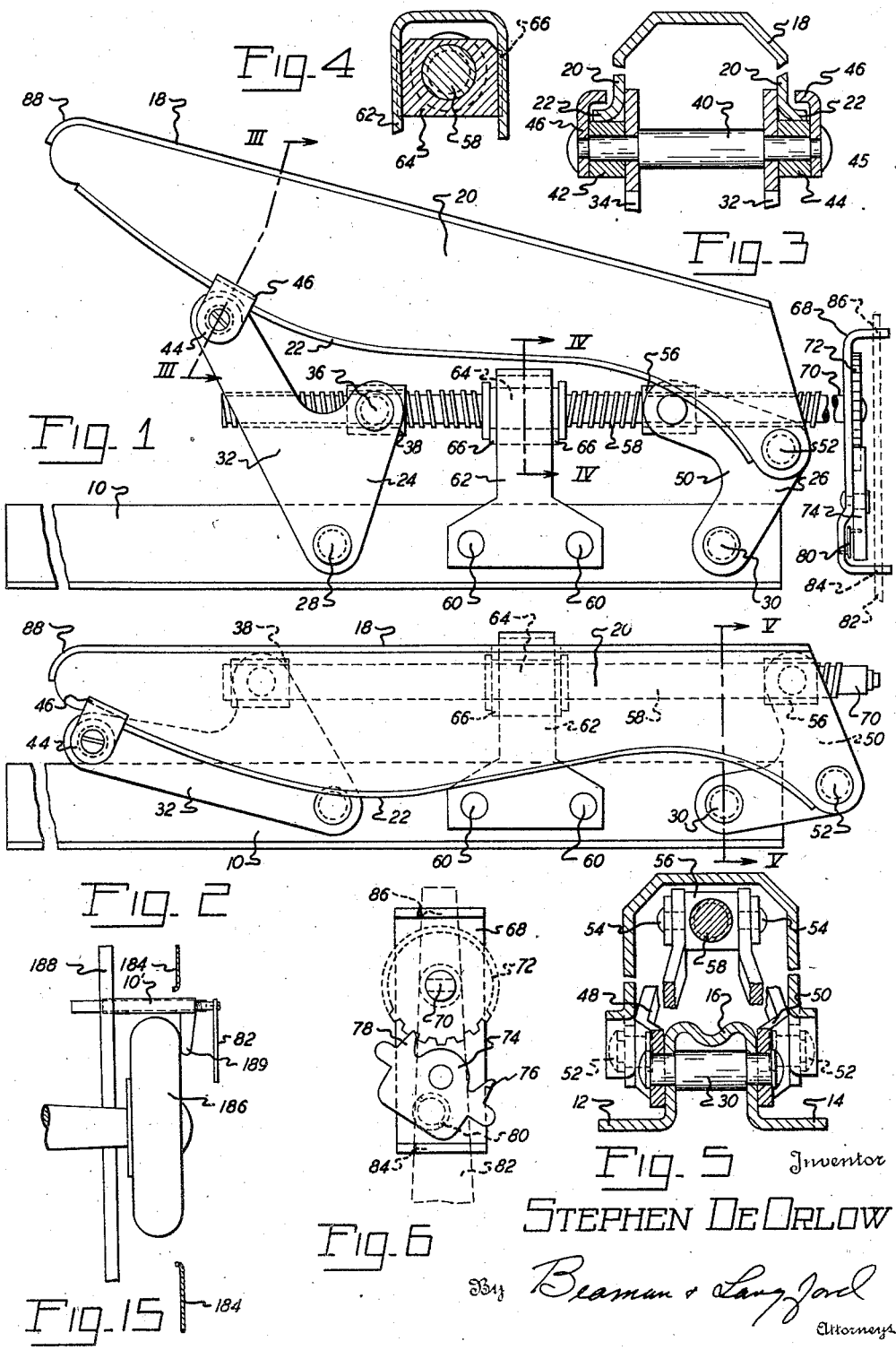

Feb. 10, 1948.  S. DE ORLOW  2,435,693
VEHICLE JACK
Filed May 15, 1941  4 Sheets-Sheet 2

Inventor
STEPHEN DeORLOW
By Beaman & Langford
Attorneys

Feb. 10, 1948.   S. DE ORLOW   2,435,693
VEHICLE JACK
Filed May 15, 1941   4 Sheets-Sheet 3

Inventor
STEPHEN DE ORLOW
By Beaman & Langford
Attorneys

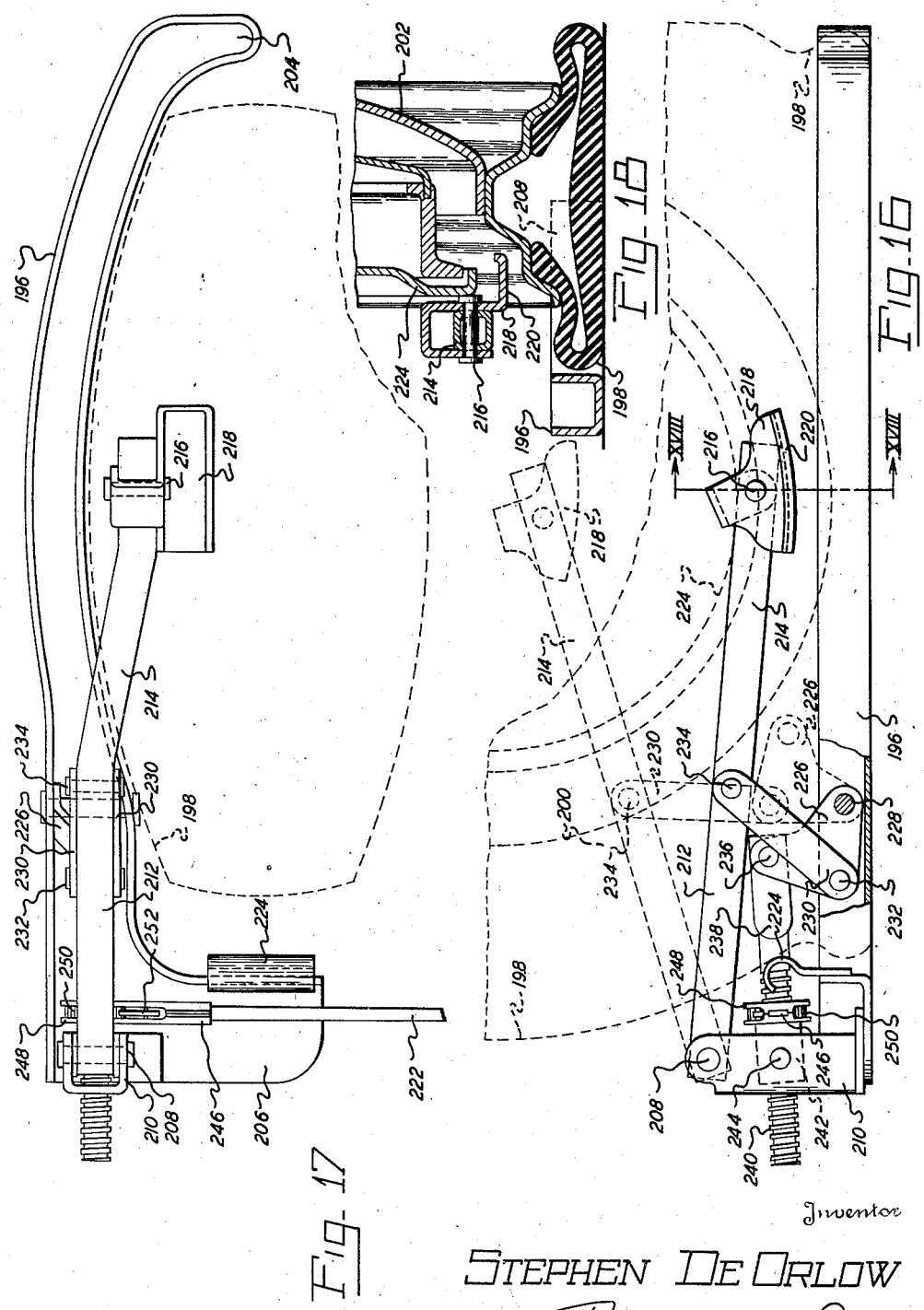

Patented Feb. 10, 1948

2,435,693

UNITED STATES PATENT OFFICE 2,435,693

VEHICLE JACK

Stephen De Orlow, Jackson, Mich., assignor to Hancock Manufacturing Company, Jackson, Mich., a corporation of Michigan Application May 15, 1941, Serial No. 393,512

6 Claims. (Cl. 254—126)

The present invention relates to improvements in lifting devices, being particularly concerned with compact vehicle jacks carried in a compartment of the vehicle for emergency use in changing wheels and tires.

Since the time vehicle jacks of the construction disclosed in my Patent No. 1,994,984 engageable with the bumper structure were generally adopted by the automotive industry, many changes in body design and wheel suspension have taken place. In an effort to meet these changed conditions so-called rim and hub lift jacks have been proposed and commercially adopted by some of the manufacturers of automobiles. Vehicle jacks of these later types are complicated in their application and use and expensive to manufacture.

I now propose an entirely new type of jack which is designed to be readily applied at or adjacent the axis of rotation of the running wheels. Preferably the jack is designed to engage a relatively unsprung part of the vehicle so as to limit the travel of the jack to a minimum in order to raise the running wheel from the ground. In practice the jack may engage a pad on or a portion of the axle, or a portion of the springs adjacent the axis of rotation of the running wheel. It is to be understood, however, that the jack may be applied to any other part of the vehicle, sprung or unsprung, as long as the maximum lift of the jack is adequate to lift the running wheel.

Accordingly, one of the objects of the present invention is to provide a vehicle jack capable of being conveniently applied to a relatively unsprung portion of a vehicle of present day body design and wheel suspension.

Another object is to provide an improved vehicle jack which I have termed a "sickle jack" characterized by its ability to be conveniently inserted between the running wheels and engage a portion of the vehicle adjacent the axis of rotation of the wheel to be lifted.

Another object is to provide a novel vehicle jack which may be positioned from the side of the vehicle and engage with a desired part of the vehicle between the wheels.

Another object is to provide a vehicle jack capable of being located for engagement with a part of the vehicle between the wheels and having a positioning gauge.

A further object is to provide a jack of the type described in which the operating handle is angularly disposed to the longitudinal axis of the jack with the handle actuated mechanism horizontally removed from the vehicle part engaging portion of the jack.

A still further object is to provide the "sickle jack" having an elongated base and an elongated lift member pivoted at one end of the base with an operating member angularly disposed to the longitudinal axis of the base.

A still further object is to provide a jack having base and lift portions positionable along the inside of the vehicle wheel to be lifted with an operating member angularly disposed to the base and functioning as a gauge in addition to its function of permitting manipulation of the jack from the outside of the wheel.

A still further object is to provide a jack having a pivoted lifting member characterized by the fact that the vehicle engaging part of the jack travels in substantially a vertical path.

These and other objects and advantages which are considered to reside in the combination, construction, and arrangement of parts will appear from the following description and annexed claims.

Figure 12:
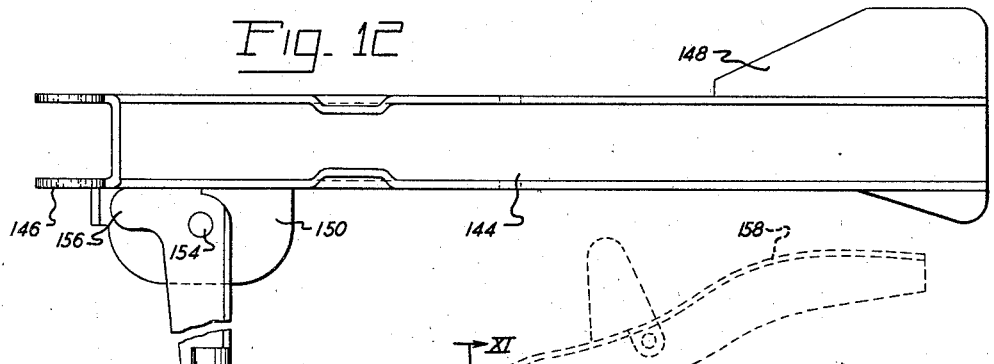
Figure 10:
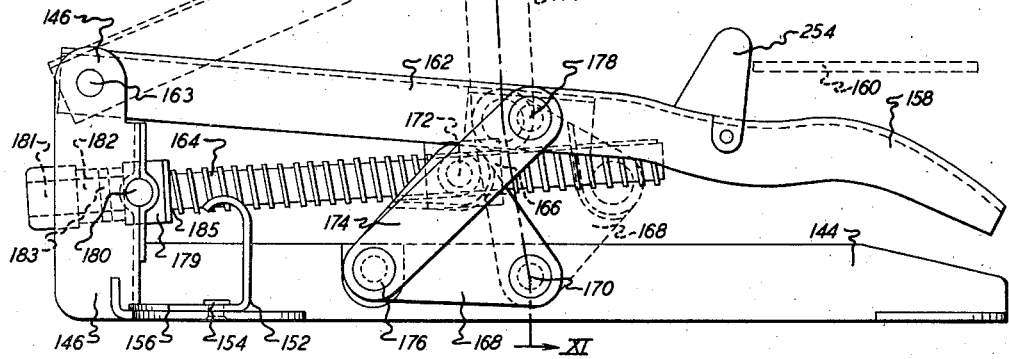
Figures 11, 13:
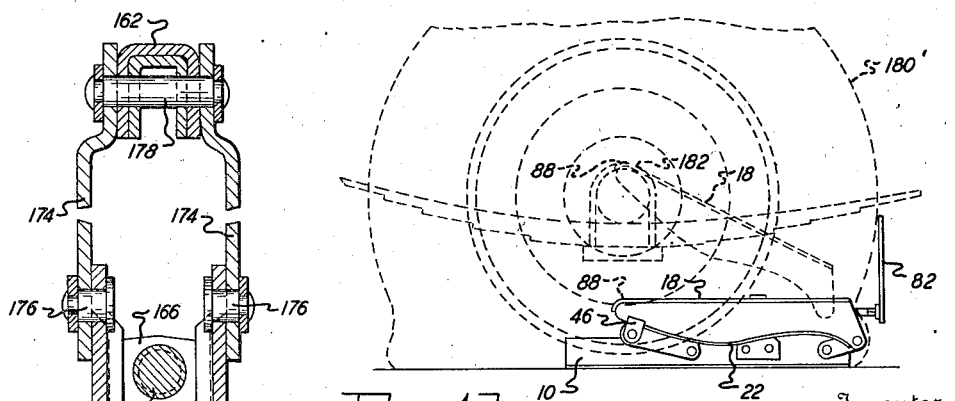

In the drawings wherein several forms embodying the principles of the present invention have been illustrated, Fig. 1 is a side elevational view of one form of the invention with the lifting member in a partially elevated position (the operating handle being shown in plan), Fig. 2 is a view similar to Fig. 1, showing the lifting member completely lowered, Fig. 3 is a cross-sectional view taken on line III—III of Fig. 1, Fig. 4 is a sectional view taken on line IV—IV of Fig. 1 of the thrust post, Fig. 5 is a sectional view taken on line V—V of Fig. 2, Fig. 6 is an end view of the ratchet mechanism for the operating handle, as shown in Fig. 1, Fig. 7 is a view similar to Fig. 2 of another form of the invention, with the lifting member shown completely lowered in full lines and raised in dotted lines, Fig. 8 is a cross-sectional view taken on line VIII—VIII of Fig. 7, Fig. 9 is a fragmentary planned view of Fig. 7 with a portion thereof shown in section taken on line IX—IX of Fig. 7, Fig. 10 shows another form of the invention, the lifting member in its lower position being in full line representation, and in its upper position in dotted line representation, Fig. 11 is a sectional view taken on line XI—XI of Fig. 10, Fig. 12 is a plan view of the base structure of the jack shown in Fig. 10 with the lifting member removed and showing the gauge extended, Fig. 13 is a side elevational view of the jack shown in Fig. 1 with its relation to the running wheel indicated by dotted line representation, Fig. 14 is a planned view of the jack shown in Fig. 13 indicating the manner in which the jack is "sickled" into position, Fig. 15 is a view similar to Fig. 14, but showing the jack engaging a vehicle part in a different manner, Fig. 16 is a side elevational view of another form of the invention as viewed from the inside of the vehicle wheel, Fig. 17 is a plan view of the jack of Fig. 16, with the outline of the deflated tire shown in dotted line, and Fig. 18 is a cross-sectional view taken on line XVIII—XVIII of Fig. 16.

In the form of the invention illustrated in Figs. 1 through 6 inclusive, the jack structure comprises a base portion 10 having flanges 12 and 14, and a central rib portion 16, all preferably fabricated of sheet metal. The lift member 18 is likewise of sheet metal, and in the illustrated form is of channel section having vertical side portions 20 which terminate in outwardly extending flange portions 22. The connections between the lift member 18 and the base 10 takes the form of pivoted members 24 and 26 attached to the base 10 through pivot pins 28 and 30. The member 24 comprises a pair of sheet metal stampings 32 and 34 having pivoted connections at 36 on the opposite sides of a nut 38. The upper ends of the members 32 and 34 are connected and spaced by a pin 40 carrying rollers 42 and 44, with which the flanges 22 have supported rolling engagement. Washers 46 hold the lift member 18 in assembled relation with respect to the rollers 42 and 44. The member 26 comprises a pair of sheet metal stampings 48 and 50 which have pivotal connections at 52 with the lower end of the lift member 18. The upper end of the members 48 and 50 have pivotal connections at 54 with a nut 56.

The nuts 38 and 56 are of opposed threads and engage with correspondingly threaded screw portions of a threaded shaft 58. Secured at 60 to opposite sides of the ridge 16 of the base 10 is an inverted U-shaped thrust post 62 through which the shaft 58 extends. Integral with the shaft 58 is a rectangular guide block 64 which has thrust portions 66 which engage with opposite sides of the post 62 to support the shaft 58 for bodily vertical movement but preventing relatively axial movement between the shaft 58 and the post 62.

For rotating the shaft 58 a ratchet bracket 68 is pivotally secured to the end 70 by a ratchet wheel 72 which is fixed to the shaft 58. A pawl 74 carried on the bracket 68 has two teeth 76 and 78 for selective engagement with the teeth of the ratchet wheel 72. A tension spring 80 holds the pawl 74 in the position to which it is moved for bringing either the tooth 76 or the tooth 78 into engagement with the teeth of the ratchet wheel 72. By inserting a suitable bar 82, shown in dotted outline, through openings 84 and 86 in the bracket 68, the bracket 68 can be directioned back and forth to rotate the shaft 58 in one direction or the other depending upon the position of the pawl 74.

It will be readily understood that rotation of the screw 58 causes the nuts 38 and 56 to move from the position shown in Fig. 2 towards the thrust post 62, as shown in Fig. 1, as the lift member 18 is raised.

The nose portion 88 of the lift member 18 is adapted to engage with the load to be lifted. As it is advantageous that the portion of the jack which contacts with the load has substantially vertical lifting movement, the jack shown in Figs. 1 and 2 has been so constructed that the nose portion 88 moves along a substantially vertical path while the lift member 18 is being raised and lowered through manipulation of the shaft 58. The path of movement of the nose 88 is controlled by the swinging action of the members 24 and 26 by their pivots 28 and 30, and the shape of the flanges 22 riding on the rollers 42 and 44. As should clearly appear from a comparison of Figs. 1 and 2, the flanges 22 are of curvilinear figuration with the rollers 42 and 44 being displaced along the flanges 22 as the lift member 18 is raised. The compound action of the swinging members 24 and 26 and the curvilinearity of the flanges 22 is so calculated as to give the nose 88 a substantially vertical movement when the jack is raised and lowered.

Referring to the form of the invention as shown in Figs. 7 to 9 inclusive, the jack structure comprises a base 90 which may be quite similar to the base 10 of the application of Fig. 1. At one end of the base 90 is an upright bracket 92 upon which is supported a sleeve 94 having pivotal movement about the pin 96. A shaft 98 extends through a nut 97 provided with a thrust collar 100 which has its action through the sleeve 94. That portion of the shaft 98 extending to the left of the nut 97 is flattened into a push and pull rod portion 101. Through a link 102 and pins 104 and 106, the rod portion 101 is connected to the upper ends of the pivoted members 110 and 112, these members being pivoted at 114 and 116 to the base 90. The members 110 and 112 are made up of two sheet metal stampings supported on the opposite sides of the central rib portion 118 of the base 90. The lift member 120 is pivotally connected to the member 112 at 122 and to the member 110 through a link 124 having a pivotal connection at 126 with the lift member 120 and with the member 110 at 127. The length and location of the pivot points of the members 110, 112 and 124 are such that the load engaging portion 128 of the lift member 120 moves along substantially a vertical path.

The mechanism for rotating the threaded shaft 98 as shown, takes the form of a forked extension 130 of the sleeve 94. Pinions 132 having stud shafts 134 with sockets 136 mesh with a gear 138. A suitable crank is removably inserted into one or the other of the sockets 136 to raise and lower the jack depending upon which socket is extending outwardly toward the operator when the jack is in position.

In the form of the invention shown in Figs. 10, 11, and 12, the jack comprises a channel shaped sheet metal base 144 having an upright portion 146 at one end with a lateral extension 148 at the opposite end. Supported for pivotal movement on an extension 150 of the base is a gauge 152 having a pivotal point 154 and a stop portion 156 which limits the outward position of the gauge 152, as shown in Fig. 12. The function of the gauge 152 is that of engaging the tread portion of the tire locating the load engaging portion 158 beneath the jack pad 160 located on the vehicle in vertical plane through the axis of rotation of the running wheel. As shown, the portion 158 is an integral part of the lift member 162 pivoted at 163 to the upper end of the upright 146.

Supported in the upright 146 for rocking movement is a rotatable screw shaft 164 threaded through a nut 166 swiveled between two members 168. The members 168 are pivotally supported on base 144 through the pin 170. The nut swivels in the members 168 about trunnions 172. Links 174 pinned at 176 and 178 connect the members 168 with the lift member 162. The shaft 164 is supported for rotation in a swiveled block 179 having trunnions 180. A socket part 181 partially telescopes with the end 182 of the shaft 164 and is held in position by a pin 183. The thrust of the shaft 164 is taken by the block 179 through the part 181 and a collar 185 fixed to the shaft 164. The opening in the socket 181 may be square to take a similarly shaped ratchet headed wrench of a suitable construction for rotating the shaft 164. Preferably the handle of such a wrench would extend at right angles to the shaft 164.

Figs. 13 and 14 illustrate the manner in which the "sickle" type of jack, of Fig. 1, for example, is used. As shown in Fig. 14, the operator by gripping the actuating lever 82 moves the jack bodily from position A into position B and then into position C. In position C the lever 82 is directly adjacent the tread of the wheel 180' thus locating the portion 88 directly under the axle 182'. In Fig. 13 the jack is shown in position C with the lever 82 adjacent the tread of the deflated tire.

In Fig. 15 the jack 10', similar to the one of Fig. 1, is shown inserted between the skirt of the fender 184 and the running wheel 186 to engage with the spring 188 to one side of the axis of rotation of the wheel. For locating, the jack 10' is shown with a gauge 189 attached to its base in the manner of the gauge 152 of Fig. 12. This merely illustrates another manner in which the jack may be conveniently used in service.

In the form of the invention shown in Figs. 16 to 18 inclusive, the base 196 is arcuate to conform to that portion 198 of the deflated tire 200 supporting the weight of the running wheel 202. Lateral portions 204 and 206 lend stability to the base 196. Pivoted at 208 to the upright 210 is a lift member 212 having an offset portion 214. Supported for swivel movement on a pin 216 is a load engaging shoe 218 having an arcuate ledge 220. When the jack is "sickled" into position through the handle 222 bringing the gauge 224 up against the tire as shown in Fig. 16, the ledge 220 will be in a position to engage the backing plate 224 of the brake structure of the wheel 202.

The mechanism shown for raising and lowering the member 212 takes the form of a pair of spaced plates 226 pivotally supported through a pin 228 to the base 196. Space links 230 pivoted to the plates 226 by a pin 232 are connected to the member 212 by the pin 234. At their upper ends the plates 226 are pivoted through a pin 236 to a flatter end 238 of the threaded shaft 240. This shaft is supported in a bearing block 242 having trunnions 244 supporting the block 242 in the upright 210 for rocking movement to compensate for the angular movement of the plate 226. The removable handle 222 is fitted into the socket 246 of the ratchet bracket 248. A nut 250 having a toothed circumference is located for relative rotation in the bracket 248. A reversible pawl 252 in the bracket 248 movable into two different positions engages with the teeth of the nut 250 to rotate the same in a load lift or lower direction, when the handle 222 is oscillated, depending upon the location of the pawl 252. It will be understood that the shaft 240 is threaded through the nut 250 and that the block 242 acts as a thrust bearing for the bracket 248. As the nut 250 is rotated, the shaft 240 is axially moved to raise and lower the member 212.

In the form of Fig. 10, an additional locating gauge 254 is provided on the lifting member 162 to assist in the location of the portion 158 beneath the load to be lifted. The gauge 254 may act in conjunction with the gauge 152 or as a substitute therefor. The function of the gauge 254 in lieu of the gauge 189 of Fig. 15 will be readily appreciated.

Having thus described my invention, what I desire to secure by Letters Patent and claim is:

1. A lifting jack for the running wheel of vehicles adapted to lift from a point adjacent the axis of rotation of the wheel and to be located from the side of the vehicle comprising a base adapted to be disposed along the inside of the wheel, a lift member, mechanism from raising and lowering said member, manipulating means for said mechanism angularly disposed and extending laterally to said base to enable the jack to be located from the outer side of the wheel with the manipulating means clearing the wheel, and means upon said jack constituting a locating gauge extending laterally substantially horizontally from the base to be positioned adjacent the periphery of the wheel to locate said base and lift member with respect to the axis of rotation of said wheel.

2. A jack for the running wheel of vehicles comprising a low elongated base member exceeding one-half the diameter of the wheel in length and adapted to be disposed parallel to and adjacent the inside of the wheel to be lifted, a load lifting member having a load engaging portion at its outer end, collapsible and extensible structure disposed between said lifting member and base, said structure in its collapsed position substantially bringing said lifting member and base into parallelism, actuating mechanism for said structure supported for movement in a general horizontal direction and disposed between said lifting member and base, and manually operable means located at one end of said base and angularly disposed to the direction of movement of said actuating mechanism so as to clear the periphery of the wheel, means constituting an operating connection between said means and said mechanism whereby said lifting member may be raised and lowered from the outer side of the wheel, and engaging means extending substantially horizontally outwardly from said base adjacent to the wheel to serve as a gauge in locating said load engaging portion.

3. A jack for the running wheel of a vehicle to be carried in a compartment of the vehicle for emergency use characterized by the fact that the same may be inserted and operated from the outer side of the wheel while being applied at the inside of the wheel adjacent the axis of rotation comprising an elongated base, an elongated load lifting means upon said base having load engaging means on one end thereof, means movable axially of said base for actuating said first means, means for imparting movement to said first and third means including an operating handle angularly disposed to said base and located at the end thereof to clear the periphery of the wheel with the jack located along the inside of the wheel and to gauge the location of the load engaging means, said handle operating in fixed relation to said base as the jack is raised and lowered.

4. A vehicle jack comprising a base, a member to be raised and lowered having a load engaging portion, a pair of horizontally spaced carriage structures positioned between said base and member and being collapsible and extensible for raising and lowering said member, said carriage structures being proportioned to have differential extension movement, connections between said carriages and said base and member for supporting said base and member in substantially parallel relation with the jack lowered, one of said carriage structures being connected at one end of said member and imparting an upward and forward movement thereto upon being extended, the other of said carriage structures having a slidable connection with said member, said slidable connection including means defining an arcuate path upon said member along which said other carriage travels when the jack is raised and lowered, said path and carriages being so proportioned that the load engaging portion of said member moves in substantially a vertical path.

5. A jack for automobile wheels having a base and a lifting member, both of elongated shape and adapted to be generally horizontally disposed with the base on the ground and the lifting member lowered, means disposed between said base and member for raising and lowering the latter, manually actuated means at one end of said base and extending laterally outwardly therefrom to enable the jack to be located on the inner side of a wheel by an operator on the outer side of the wheel, means operating said means to raise and lower said member, and gauge means on the base extending substantially laterally and horizontally adjacent to said manually actuated means and engageable with a portion of the wheel for locating the load engaging portion of said member.

6. A wheel jack for automobiles to be carried in a compartment thereof for emergency use, characterized by its adaptability to be positioned along the inside of a running wheel to lift from a point adjacent the axis of rotation of the wheel and to be operated by a person standing at the outer side of the wheel, said jack comprising an elongated base of sufficient length to extend from a point substantially adjacent the periphery of the wheel to a point beyond the axis of rotation of the wheel, engaging and manipulating means angularly laterally disposed to said base extending across the plane of rotation of the wheel to engage with the periphery of the wheel and to be accessible from the outer side of the wheel, a load engaging member, mechanism located between said base and said member to raise and lower said member along a substantially vertical axis intersecting said base, and an operative connection between said mechanism and said manipulating means, said engaging and manipulating means being supported in fixed relation on said base relative to the vertical axis of movement of said load engaging member during the operation of said manipulating means.

STEPHEN DE ORLOW.

REFERENCES CITED

The following references are of record in the file of this patent:

UNITED STATES PATENTS

| Number | Name | Date |
|---|---|---|
| 2,230,250 | Jackson | Feb. 4, 1941 |
| 1,926,610 | Berglund | Sept. 12, 1933 |
| 1,900,528 | Statz | Mar. 7, 1933 |
| 1,800,384 | Haack | Apr. 14, 1931 |
| 458,847 | Hooker et al. | Oct. 1, 1891 |
| 391,141 | Golightly et al. | Oct. 16, 1888 |